(12) United States Patent
Nhan et al.

(10) Patent No.: US 12,557,074 B2
(45) Date of Patent: Feb. 17, 2026

(54) WIRELESS LINK CONFIGURATION

(71) Applicant: Nokia Technologies Oy, Espoo (FI)

(72) Inventors: Nhat-Quang Nhan, Massy (FR); Karri Markus Ranta-Aho, Espoo (FI); Esa Tapani Tiirola, Oulu (FI); Marco Maso, Massy (FR); Alessio Marcone, Munich (DE); Amir Mehdi Ahmadian Tehrani, Munich (DE); Arman Ahmadzadeh, Munich (DE)

(73) Assignee: Nokia Technologies Oy, Espoo (FI)

( * ) Notice: Subject to any disclaimer, the term of this patent is extended or adjusted under 35 U.S.C. 154(b) by 339 days.

(21) Appl. No.: 18/464,679

(22) Filed: Sep. 11, 2023

(65) Prior Publication Data

US 2024/0155567 A1    May 9, 2024

(30) Foreign Application Priority Data

Nov. 7, 2022   (FI) ..................................... 20226004

(51) Int. Cl.
*H04W 72/02* (2009.01)
*H04W 72/0453* (2023.01)
*H04W 72/232* (2023.01)

(52) U.S. Cl.
CPC ....... *H04W 72/02* (2013.01); *H04W 72/0453* (2013.01); *H04W 72/232* (2023.01)

(58) Field of Classification Search
CPC ............. H04W 72/02; H04W 72/0453; H04W 72/232; H04W 72/044; H04W 72/23;
(Continued)

(56) References Cited

U.S. PATENT DOCUMENTS

2017/0289969 A1* 10/2017 Zhou ................... H04L 27/2646
2018/0049233 A1    2/2018 Luo et al.
(Continued)

FOREIGN PATENT DOCUMENTS

WO    2018/229736 A1    12/2018
WO    2022/190379 A1    9/2022

OTHER PUBLICATIONS

"3rd Generation Partnership Project; Technical Specification Group Radio Access Network; NR; Physical layer procedures for data (Release 17)", 3GPP TS 38.214, V17.3.0, Sep. 2022, pp. 1-232.
(Continued)

*Primary Examiner* — Kwang B Yao
*Assistant Examiner* — Syed M Bokhari
(74) *Attorney, Agent, or Firm* — Nokia Technologies Oy

(57) ABSTRACT

According to an example aspect of the present invention, there is provided an apparatus comprising at least one processing core and at least one memory storing instructions that, when executed by the at least one processing core, cause the apparatus at least to determine whether each condition from among a set comprising at least one condition is fulfilled, based on the set of conditions being fulfilled, obtain a waveform selection indication from an element of a downlink control information element received in the apparatus from a network, and use, in at least one transmission or reception, a waveform selected based on the waveform selection indication, and based on the set of conditions not being fulfilled, use a default waveform, a previously used waveform or a currently used waveform in the at least one transmission or reception.

11 Claims, 5 Drawing Sheets

(58) Field of Classification Search
CPC .. H04W 72/535; H04L 5/0044; H04L 5/0092; H04L 27/0008; H04L 27/2602; H04L 5/0048; H04L 5/0028; H04L 5/0012; H04L 5/0026
USPC .......................................................... 370/329
See application file for complete search history.

(56) References Cited

U.S. PATENT DOCUMENTS

| | | | | |
|---|---|---|---|---|
| 2020/0068539 | A1* | 2/2020 | Liu | H04L 5/0053 |
| 2020/0154428 | A1* | 5/2020 | Takeda | H04L 27/2636 |
| 2020/0162225 | A1 | 5/2020 | Chen Larsson et al. | |
| 2024/0097959 | A1* | 3/2024 | Nory | H04L 27/2646 |

OTHER PUBLICATIONS

"New WI: Further NR coverage enhancements", 3GPP TSG RAN Meeting #94e, RP-213579, Agenda: 8.6.1, China Telecom, Dec. 6-17, 2021, 5 pages.

"Summary #4 on dynamic switching between DFT-S-OFDM and CP-OFDM", 3GPP TSG RAN WG1 #110 bis-e, R1-2210749, Agenda: 9.14.3, InterDigital, Inc, Oct. 10-19, 2022, 51 pages.

Finnish Application No. 20225859, "Determining Waveform for Uplink Transmission", filed on Sep. 29, 2022, pp. 1-32.

Finnish Application No. 20227129, "Determining Waveform for Uplink Transmission", filed on Sep. 30, 2022, pp. 1-35.

Finnish Application No. 20225780, "Client Device Operation Mode Indication, and Related Devices, Methods and Computer Programs", filed on Sep. 8, 2022, pp. 1-37.

"NR Radio Frequency and co-existence", 3GPP TSG RAN WG4 Chairman, Samsung, Oct. 24-25, 2018, pp. 1-21.

"3rd Generation Partnership Project; Technical Specification Group Radio Access Network; NR; User Equipment (UE) radio transmission and reception; Part 1: Range 1 Standalone (Release 17)", 3GPP TS 38.101-1, V17.7.0, Sep. 2022, 723 pages.

"Summary on Rel-17 TEIs", 3GPP TSG RAN WG1 #106bis-e, R1-2109722, Agenda: 8.18, NTT Docomo Inc, Oct. 11-19, 2021, pp. 1-101.

Office action received for corresponding Finnish Patent Application No. 20226004, dated May 15, 2023, 10 pages.

\* cited by examiner

WIRELESS LINK CONFIGURATION

RELATED APPLICATION

The present application claims priority from, and the benefit of, Finnish Patent Application No. 20226004, filed Nov. 7, 2022, which is hereby included by reference in its entirety.

FIELD

The present disclosure relates to a configuration of a wireless link, for example, a selection of a waveform for the wireless link.

BACKGROUND

Wireless communication may take place in a cellular or non-cellular system based on different waveforms. In general, a signal's waveform is shape of a graph of the signal as a function of time, the shape characteristic not regarding the magnitude of the signal. Simple examples of waveforms include a sine wave, a square wave and a saw-tooth wave. For communication, modulated symbols and/or reference signals are converted to a waveform, which is a baseband signal, before mixing it to a radio frequency and transmitting over an air interface.

In cellular communication systems, code division multiple access, CDMA, frequency-division multiple access, FDMA and single-carrier FDMA, SC-FDMA, waveforms, have been used. Different waveforms have differing properties, such as peak-to-average power ratio, PAPR, which affect their usability in different cellular communication scenarios. On the non-cellular side, wireless local area network, WLAN, and worldwide interoperability for microwave access, WiMAX, use orthogonal frequency division multiple access, OFDM, waveforms.

In some wireless communication solutions, a waveform may be selected during use, to enable adapting the used waveform to characteristics of the communication environment and needs of the moment.

SUMMARY

According to some aspects, there is provided the subject-matter of the independent claims. Some embodiments are defined in the dependent claims. The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According to a first aspect of the present disclosure, there is provided an apparatus comprising at least one processing core and at least one memory storing instructions that, when executed by the at least one processing core, cause the apparatus at least to determine whether each condition from among a set comprising at least one condition is fulfilled, based on the set of conditions being fulfilled, obtain a waveform selection indication from an element of a downlink control information element received in the apparatus from a network, and use, in at least one transmission or reception, a waveform selected based on the waveform selection indication, and based on the set of conditions not being fulfilled, use a default waveform, a previously used waveform or a currently used waveform in the at least one transmission or reception.

According to a second aspect of the present disclosure, there is provided an apparatus comprising at least one processing core and at least one memory storing instructions that, when executed by the at least one processing core, cause the apparatus at least to decide whether each condition from among a set comprising at least one condition is fulfilled, based on the set of conditions being fulfilled, provide to a user equipment a waveform selection indication in an element of a downlink control information, and use, in at least one transmission or reception, a waveform selected based on the waveform selection indication, and based on the set of conditions not being fulfilled, use a default waveform, a previously used waveform or a currently used waveform in the at least one transmission or reception.

According to a third aspect of the present disclosure, there is provided a method comprising determining, in an apparatus, whether each condition from among a set comprising at least one condition is fulfilled, based on the set of conditions being fulfilled, obtaining a waveform selection indication from an element downlink control information received in the apparatus from a network, and using, in at least one transmission or reception, a waveform selected based on the waveform selection indication, and based on the set of conditions not being fulfilled, using a default waveform, a previously used waveform or a currently used waveform in the at least one transmission or reception.

According to a fourth aspect of the present disclosure, there is provided a method comprising decide whether each condition from among a set comprising at least one condition is fulfilled, based on the set of conditions being fulfilled, providing to a user equipment a waveform selection indication in an element of a downlink control information, and using, in at least one transmission or reception, a waveform selected based on the waveform selection indication, and based on the set of conditions not being fulfilled, using a default waveform, a previously used waveform or a currently used waveform in the at least one transmission or reception.

According to a fifth aspect of the present disclosure, there is provided an apparatus comprising means for determining, in an apparatus, whether each condition from among a set comprising at least one condition is fulfilled, means for, based on the set of conditions being fulfilled, obtaining a waveform selection indication from an element downlink control information received in the apparatus from a network, and for using, in at least one transmission or reception, a waveform selected based on the waveform selection indication, and means for, based on the set of conditions not being fulfilled, using a default waveform, a previously used waveform or a currently used waveform in the at least one transmission or reception.

According to a sixth aspect of the present disclosure, there is provided an apparatus comprising means for deciding whether each condition from among a set comprising at least one condition is fulfilled, means for, based on the set of conditions being fulfilled, providing to a user equipment a waveform selection indication in an element of a downlink control information, and for using, in at least one transmission or reception, a waveform selected based on the waveform selection indication, and means for, based on the set of conditions not being fulfilled, using a default waveform, a previously used waveform or a currently used waveform in the at least one transmission or reception.

According to a seventh aspect of the present disclosure, there is provided a non-transitory computer readable medium having stored thereon a set of computer readable instructions that, when executed by at least one processor, cause an apparatus to at least determine whether each condition from among a set comprising at least one condition is fulfilled, based on the set of conditions being fulfilled, obtain a waveform selection indication from an element of a downlink control information received in the apparatus from a network, and use, in at least one transmission or reception, a waveform selected based on the waveform selection indication, and based on the set of conditions not being fulfilled, use a default waveform, a previously used waveform or a currently used waveform in the at least one transmission or reception.

According to an eighth aspect of the present disclosure, there is provided a non-transitory computer readable medium having stored thereon a set of computer readable instructions that, when executed by at least one processor, cause an apparatus to at least decide whether each condition from among a set comprising at least one condition is fulfilled, based on the set of conditions being fulfilled, provide to a user equipment a waveform selection indication in an element of a downlink control information, and use, in at least one transmission or reception, a waveform selected based on the waveform selection indication, and based on the set of conditions not being fulfilled, use a default waveform, a previously used waveform or a currently used waveform in the at least one transmission or reception.

EMBODIMENTS

Described herein are methods to indicate a waveform to use in a wireless communication system, the indication method being optimized to consume fewer radio resources than alternative indication methods. In detail, the disclosed indication method is a two-stage method comprising an initial stage of determining whether one condition, each one of more than one condition, or one or more of more than one condition is/are satisfied, and if this is the case, then obtaining a waveform selection indication from a downlink control information element received from the network. This produces the beneficial technical effect, that the waveform selection indication, or a field for it, need not be transmitted in case the prevailing communication conditions are of a type where a change in waveform is not needed. This results in a saving in energy and time used in provision of the control information. In case no waveform selection indication is provided and received, the waveform is not changed, that is, the waveform in use, or previously in use, is used for future transmission and/or reception.

Figure 1:
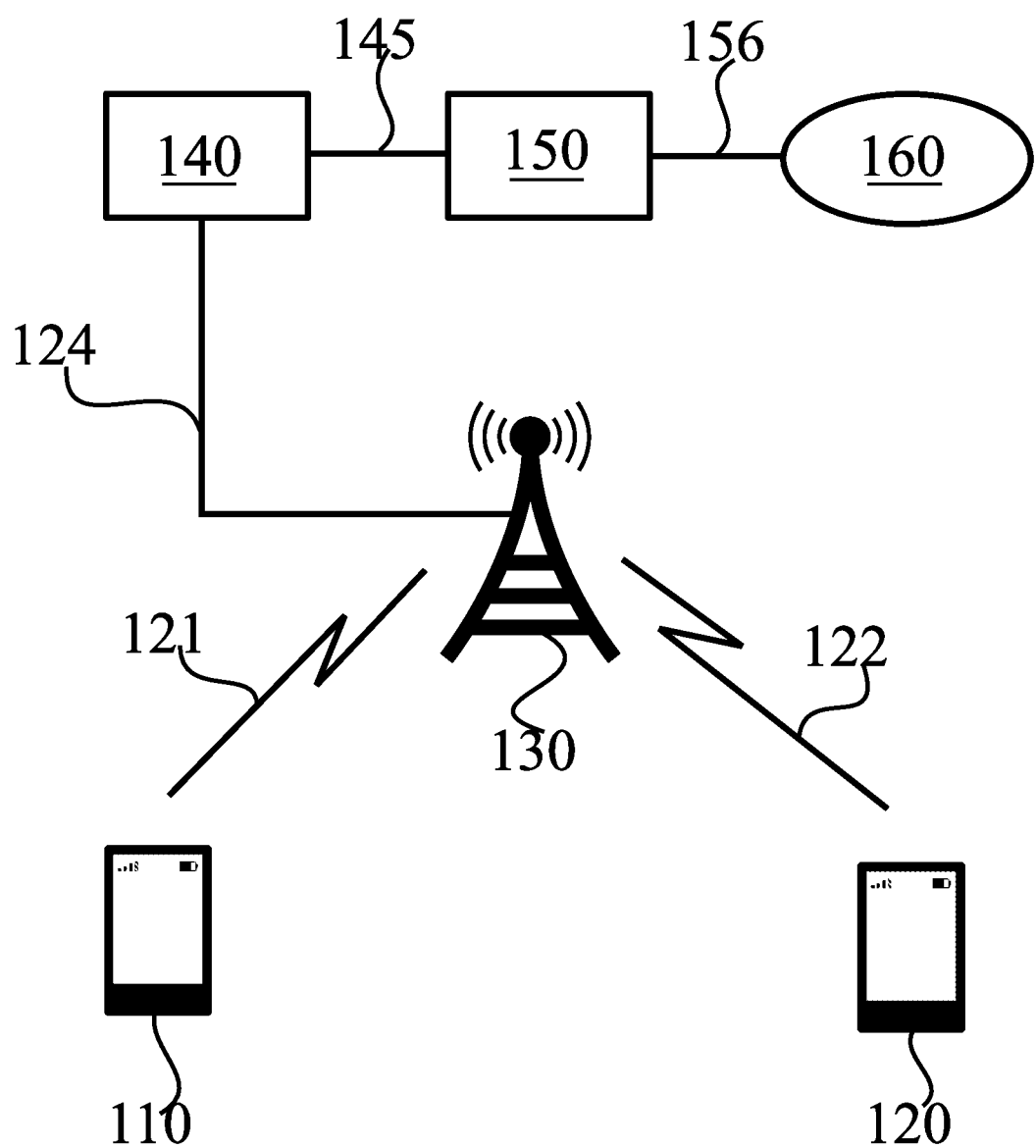
FIG. 1 illustrates an example system in accordance with at least some embodiments of the present invention.

FIG. 1 illustrates an example system in accordance with at least some embodiments of the present invention. The example of FIG. 1 is a cellular system, but the herein disclosed methods are not limited to being applied in a cellular context. FIG. 1 illustrates a base station 130, which is configured to operate in accordance with a cellular communication standard, such as long term evolution, LTE, fifth generation, 5G, also known as New Radio, NR, or 5G-Advanced, as specified by the $3^{rd}$ generation partnership project, 3GPP. Where a non-cellular system is used, an access node, such as access point, corresponding to base station 130 may be configured in accordance with a non-cellular communication standard such as wireless local area network, WLAN, or worldwide interoperability for microwave access, WiMAX, for example.

Base station 130 is coupled with a core network node 140 via link 124, which may comprise a wire-line connection, for example. Core network node 140 may comprise a mobility management entity, MME, a serving gateway, S-GW, or an access and mobility management function, AMF, for example. The core network may comprise a gateway 150, connected to core network node 140 via link 145. Gateway 150 enables communication with further networks 160, via inter-network link 156. In non-cellular systems, core network node 150 and gateway 150 may be absent, with the access node corresponding to base station 130 being directly connected to further networks, for example. Link 145 and inter-network link 156 may be wire-line links, for example. In an embodiment, base station functionalities are split between a control unit, CU, and one or more distributed unit, DU. In an embodiment, UE functionalities are carried out by mobile termination, MT, part of an integrated access and backhaul node, IAB. In an embodiment, DU functionalities are carried out by a distributed unit part of an integrated access and backhaul, IAB, node.

Further, in the illustrated example situation, base station 130 is in wireless radio communication with user equipments, UEs 110 and 120. Each UE may comprise, for example, a smartphone, feature phone, tablet or laptop computer, Internet-of-Things, IoT, node, smart wearable or a connected car connectivity module, for example. Naturally, separate UEs need not be of the same type. Wireless communication link 121 connects base station 130 with UE 110, and wireless communication link 122 connects base station 130 with UE 120. Wireless communication links 121, 122 may each have an uplink for conveying information from the respective UE to base station 130, and a downlink for conveying information from base station 130 to the respective UE.

The UEs 110, 120 and base station 130 may be configured to use, selectively, a first or a second waveform in wireless communication links 121, 122. The used waveform may be switched based on need, and the links 121, 122 need not simultaneously use the same waveform, rather, for example, wireless communication link 121 may use the first waveform while wireless communication link 122 uses the second waveform. The switching of the waveform may take place as directed by the network, for example directed by base station 130.

For example, the first waveform may be a cyclic prefix orthogonal frequency division multiplexing, CP-OFDM, waveform and the second waveform may be DFT-spread orthogonal frequency division multiplexing, DFT-s-OFDM, where DFT is the discrete Fourier transform. In some technologies, such as the 5G technology, CP-ODFM may be used in both uplink and downlink, while DFT-s-OFDM is used in uplink, only. In future radio-access technologies, DFT-s-OFDM may be used in downlink as well. Thus in e.g. 5G, waveform switching applies to the uplink only. While discussed herein primarily in terms of CP-OFDM and DFTs-OFDM, in other embodiments the first and second waveforms may be e.g. CDMA and FDMA waveforms, or indeed other waveforms. Indeed, the herein disclosed solutions may be applied to any waveform combinations among CP-OFDM, DFT-s-OFDM, and any DFT-s-OFDM variations. Examples of such DFT-s-OFDM variations include DFT-s-OFDM with frequency domain spectrum shaping (FDSS), DFT-s-OFDM with FDSS and spectrum extension, DFT-s-OFDM with tone reservation, DFT-s-OFDM with FDSS, spectrum extension and tone reservation, and Known tail DFT-s-OFDM. A further example of a possible waveform is CP-OFDM with tone reservation. Yet further, even though the present disclosure is presented from the viewpoint that there are two waveforms to choose from, also more than two waveform candidates may be in the considered selection.

DFT-s-OFDM supports only a single transmission layer (rank=1) per user whereas CP-OFDM can support more than one layer (rank>=1). This means that CP-OFDM can offer a higher data throughput and capacity than DFT-s-OFDM. DFT-s-OFDM, on the other hand, has a lower peak-to-average power ratio, PAPR, than CP-OFDM, which allows DFT-s-OFDM to be used with a higher transmit power and to offer better coverage. The higher power may be used, since the lower PAPR works better with power amplifiers used in radio transmitters. For example, with QPSK modulation DFT-s-OFDM supports 1.5-2 dB higher transmit power (depending on the resource block allocation) compared to CP-OFDM (this is defined by means of allowed maximum power reduction compared to the nominal transmit power of the corresponding power class, such as 23 dBm (for Power Class 3)). In some cases, thus, DFT-s-OFDM may be desirable at a cell edge, for example, where a high transmit power, possibly maximum transmit power, may be needed, while CP-ODFM may be used nearer the base station controlling the cell, for example, to provide high-throughput services.

DFT-s-OFDM is generated by adding a transform precoding block before processing blocks used for generating CP-OFDM. The transform precoding block is a fast Fourier transform, FFT, (also known as discrete Fourier transform, DFT) block which converts a time domain signal into frequency domain signal. Due to the transform precoding block used in the transmitter, the waveform has to be separately configured so that receiver can perform the inverse fast Fourier transform operation, iFFT (or inverse discrete Fourier transform, IDFT). In some embodiments, there may be an FDSS block, or FUSS and spectrum extension blocks, or tone reservation block, or tone reservation and spectrum extension blocks between FFT and iFFT. These functionalities may be used to further reduce the peak-to-average power ratio of the DFT-s-OFDM transmission.

In prior systems, semi-static configuration of uplink waveform is supported via radio resource control, RRC, specifically, the following rules are applied in some systems: firstly, In case the parameter transformPrecoder in PUSCH-Config or the parameter ConfiguredGrantConfig is enabled, DFT-s-OFDM waveform is applied for the corresponding physical uplink shared channel, PUSCH, transmissions. Otherwise, CP-OFDM is applied. Secondly, In case msg3-transformPrecoder in RACH-ConfigCommon is configured, DFT-s-OFDM is applied for Msg3 in a random access channel, RACH, procedure. Otherwise, CP-OFDM is applied. A more dynamic configuration of waveform would be beneficial to enable using an optimal waveform more nimbly, as RRC signalling involves significant overheads and cannot accomplish quick switching.

Downlink control information, DCI, is a set of information transmitted from a base station to a UE which schedules a downlink data channel, such as physical uplink shared channel, PDSCH, or an uplink data channel, such as PUSCH. A DCI may comprise, for example, a definition on which resource block will carry data to/from a UE and what kind of demodulation/modulation scheme a UE will have to use to decode/encode its data. The receiver will first decode DCI, and based on the information from the DCI it can decode the real data. In 5G, DCI formats 0_0, 0_1 and 0_2 are used to schedule PUSCH in one cell. The solutions of the present disclosure, however, are not limited to these DCI formats in 3GPP 5G, rather, any DCI format may be used with these solutions keeping in mind the downlink scenario, thus e.g. DCI formats 1_0 and 1_1 could be used, for example.

One way to enable more dynamic switching would be to include a new field in downlink control information, DCI, sent from a base station to a user equipment, UE, to carry a waveform selection indication. However, this solution has the drawback that the new field would be statically always present, even when the waveform isn't being switched, resulting in reduced physical downlink control channel, PDCCH coverage and wasting energy. Another way would be to re-purpose an existing field in DCI, however this has the drawback that usage of the field to its normal use is affected, as fewer bits would be available for the original use. Further, it is possible to use an implicit indication by considering a combination of conditions present in scheduling information, such as DCI. However, this solution has the drawback that the network would always have to consider, whether an intended scheduling solution in fact would amount to the implicit waveform switching indication, wherein this would practically limit the freedom the network has in formulating its scheduling information to avoid unintentional waveform switches.

A solution is needed to address, or at least alleviate, the above described drawbacks of signalling solutions. One possible solution is that, instead of always adding a field or repurposing a bit or considering conditions, that the system will only do so if the PDCCH carrying the scheduling DCI fulfils some scheduling conditions considering the scheduling used to deliver the PDCCH, for example that the PDCCH is scheduled in a predefined occasion or a pre-defined search space, or scrambled with some predefined radio network temporary identity, RNTI. One drawback of this idea is that PDCCH occasions/search spaces are limited, considering that scheduling PDCCH may be needed for multiple UEs. Thus the new field would have to be added fairly frequently, also when no waveform switching is needed. Therefore, another solution, for example based on considering scheduling conditions of the scheduled transmission(s), instead of scheduling conditions of the PDCCH channel itself, might be used to trigger placing the waveform selection indication, and correspondingly reading the waveform selection indication.

Described herein are two-stage methods for dynamic waveform switching indication and determination, which combine conditions with an explicit waveform selection indication. Firstly, in a first stage of the two-stage method, the UE determines whether one or more pre-determined condition is fulfilled, the one or more condition being used to indicate whether a waveform selection indication is provided, for example, if at least one field in scheduling DCI, is to be repurposed or added to provide the waveform selection indication. The condition, or conditions, may depends on the current or configured waveform and/or the scheduling information content in the downlink control information, such as the DCI, for example. In a second stage of the two-stage method, the UE determines the waveform selection indication as a response to the condition(s) being fulfilled, and based on this indication chooses a waveform for a scheduled transmission or reception. The waveform selection indication may be obtained from the downlink control information, such as, for example, the DCI, by reading at least one bit in at least one field in the downlink control information, such as the scheduling DCI, if and only if the condition(s) in the first step is, or are, satisfied. Otherwise, the current/configured waveform is used and no change in waveform is performed.

Optionally, as a preparatory step, the UE may receive from the network an indication, for example via RRC signalling, on whether or not to use the two-step method to obtain the waveform selection indication. In some embodiments the UE may receive from the network an indication, for example an extent indication, for example via RRC or broadcast signaling, on whether the waveform selected using the waveform selection indication is applied only for the one or multiple transmission(s) scheduled by the DCI used to extract the waveform selection indication, or also for subsequent uplink transmissions.

Figure 2:
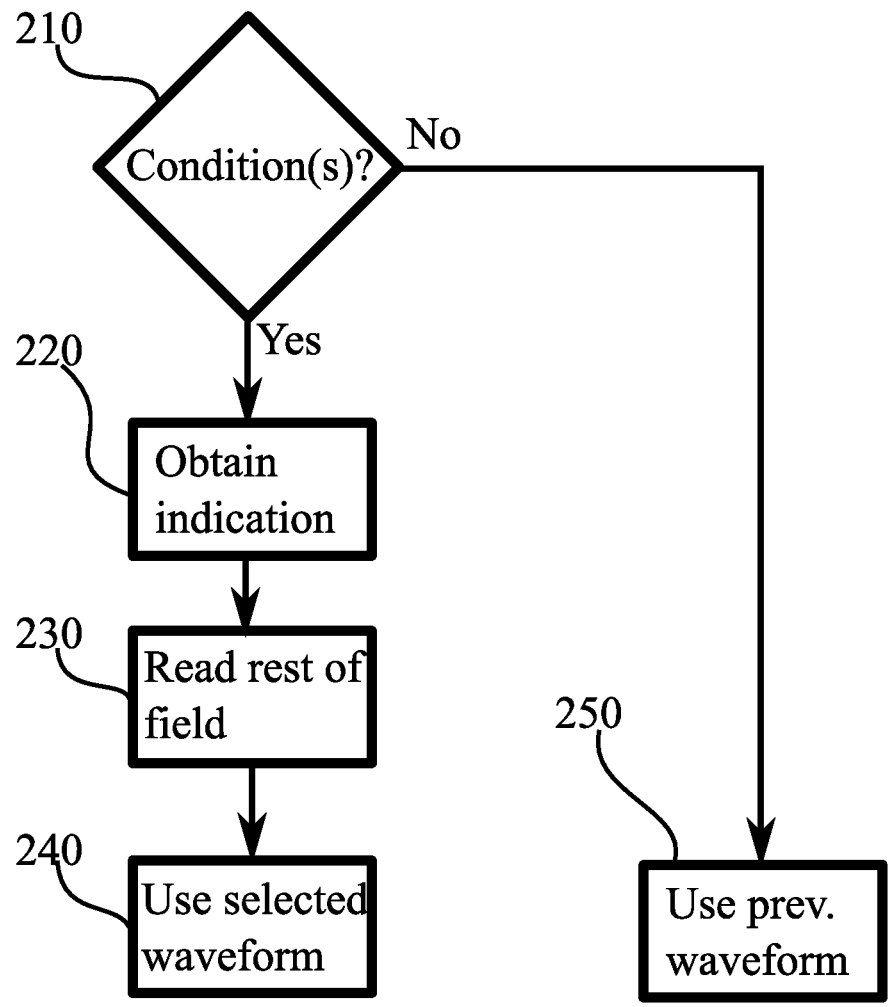
FIG. 2 illustrates a two-step method for selecting waveform.

FIG. 2 illustrates a two-step method for selecting waveform. Processing begins in phase 210, where a UE determines, if the at least one condition is fulfilled. In case the condition is not fulfilled, or the conditions are not fulfilled, processing proceeds to phase 250, where the waveform in use (for example a default waveform) is continued to be used, that is, no change in waveform is performed. As described above, in some embodiments this phase considers the conditions fulfilled if at least one, or at least two, conditions from a larger set of conditions are fulfilled. In other embodiments the conditions are considered fulfilled when each condition in the set of conditions of phase 210 is fulfilled.

On the other hand, in case the condition is, or the conditions are, fulfilled, processing advances from phase 210 to phase 220, where the waveform selection indication is obtained from downlink control information, such as, for example, a DCI. The waveform selection indication may be provided in a separate field, added to the downlink control information by the base station as a response to the condition(s) being fulfilled, or the waveform selection indication may be obtained by the UE from a field in the downlink control information which is used also for another purpose, such that a subset of the bits of the field, for example one bit, is repurposed to convey the waveform selection indication and the rest of the bits of the field are used for its usual purpose. For example, a frequency domain resource allocation, FDRA, field may be used for this purpose. In some embodiments, multiple bits are used to convey the waveform selection indication. Using several bits provides the benefit that the corresponding signalling states for waveform selection indication, can be split unevenly between two waveforms. For example, with two bits, one signalling state [00] can be reserved for waveform A, while three signalling states [01, 10, 11] can be reserved for waveform B. When indicating the waveform with the existing signalling bits or signalling states, the signalling may still be used to indicate (in addition to the new purpose, i.e. waveform) also the parameters that are usually signalled using these fields (i.e. without the new/additional meaning). For example, if frequency hopping bit is used to indicate the waveform, frequency hopping may always off for waveform A, and always on for waveform B, respectively. In another scenario, the new purpose (i.e. indicating the waveform) replaces the usual signalling purpose, which means that the signalling capabilities are slightly reduced for the usual purpose. For example, if frequency hopping bit is used to indicate the waveform, there may be no possibilities to switch the frequency hopping on.

In case a field is used phase 220 that also carries other information, then the bits of the field not used to convey the waveform selection indication are read in phase 230, wherein this reading may use an adapted method of construing the meaning of the subset of bits not comprising the waveform selection indication. If an additional field is used to convey the waveform selection indication, phase 230 is skipped. Phases 210 and 220 may be performed in either order, phase 210 first or phase 220 first.

In phase 240, a waveform indicated by the waveform selection indication is used, for example, in one or more transmissions and/or receptions scheduled using the downlink control information from which the waveform selection indication is read in phase 220.

As an alternative to the method described above, the UE may be configured to determine the waveform to use by determining it based on a second set of conditions, the second set of conditions comprising at least one condition, the second set of conditions being different from the condition(s) of phase 210. In this case the second set of conditions is considered only in case the set of at least one condition, phase 210, is fulfilled.

The condition(s) of phase 210, and/or the second set of conditions, may depend on the current, configured or default waveform and scheduling information in at least one field of the scheduling downlink control information. The bit(s) used to convey the waveform selection indication may be, for example, a most significant, or least significant, bit in FDRA or a frequency-hopping flag bit, for example. Otherwise, FDRA may work as usually. Alternatively it may be the most or least significant bit in any field in the downlink control information. Where the frequency-hopping bit is used, of the conditions(s) of phase 210 are fulfilled, then the frequency-hopping flag bit may be used to adjust the waveform in a predefined manner, or in a manner instructed to the UE by RRC signalling, for example. In one example, in this case where the frequency-hopping bit is set to zero, frequency hopping is not used with CP-OFDM and if to one, frequency hopping is not used with DFT-s-OFDM. The second set of conditions may depend on current, configured or default waveform and scheduling information in at least one field of the downlink control information that is different from the first set of conditions. The first set and second set of conditions may thus differ in at least one condition. Using as basis for the conditions features of the signalled downlink control information, rather than features of the scheduling of the PDCCH channel itself, is beneficial in terms of not restricting the PDCCH scheduling space, facilitating scheduling a larger number of UEs. Using the current or configured waveform in at least one of the conditions enables setting a non-symmetric waveform switching mechanism, in case, for example, it is envisioned that one of the waveforms will be used much more often than the other one.

In case the condition(s) of phase 210 happen to be fulfilled when the network does not intend to switch the waveform, it may simply provide as a waveform switching indication an indication indicating that the current waveform is to be used. The conditions may nonetheless achieve the effect that this indication does not need to be provided very often.

Examples of the conditions of phase 210 are provided in the following:

Firstly, the set of conditions of phase 210 may comprise that the current waveform is CP-ODFM and at least one of the following: a modulation and coding scheme, MCS, index is below a first threshold, a modulation order is below a second threshold, a number of allocated physical resource blocks, PRBs, is below a third threshold and/or is a multiple of 2, 3 or 5, the allocated frequency resource is in the outer or edge region of the carrier, a resource block allocation based on a first resource block and allocation length is indicated, multiple transmissions are scheduled, the number of multiple transmissions scheduled by DCI carrying the waveform selection indication is above a fourth threshold, demodulation reference signals, DMRS, and data are not multiplexed in frequency domain, and a number of multiple input multiple output, MIMO, layers is equal to one. For example, the set of conditions may comprise that the current waveform is CP-OFDM, MCS is below a threshold and multiple transmissions are scheduled, the number of multiple transmissions scheduled by DCI carrying the waveform selection indication is above another threshold. In other words, if the first set of conditions of phase 210 is fulfilled, then it is possible to continue using CP-OFDM or switch to DFT-s-OFDM. If not, then CP-OFDM is continued to be used.

Secondly, the set of conditions of phase 210 may comprise that the current waveform is DFT-s-OFDM and at least one of the following: MCS index is above a fifth threshold, modulation order is above a sixth threshold, a number of allocated PRBs is above a seventh threshold and/or is a multiple of 2, 3, or 5, the allocated frequency resource is in an inner region of the carrier, resource block allocation based on bitmaps is indicated, a number of multiple transmissions scheduled by the downlink control information is below an eighth threshold, and DMRS and data are multiplexed in frequency domain. In other words, if the first set of conditions of phase 210 is fulfilled, then it is possible to continue using DFT-s-OFDM or switch to CP-OFDM. If not, then DFT-s-OFDM is continued to be used The second set of conditions, used in some embodiments instead of phases 220 and 230, as described above, may depend on the current waveform and scheduling information in at least one field of the downlink control information used to schedule the data the waveform is to be selected for. In general the second set of conditions differs from the condition(s) of phase 210, ant may comprise, for example, the following:

Firstly, DFT-s-OFDM is to be selected if the current waveform is CP-OFDM and at least one of the following: MCS index is below a threshold, modulation order is below a threshold, a number of allocated PRBs is below a threshold and/or is in multiple of 2, 3, or 5, the allocated frequency resource is in the outer or edge region of the carrier resource block allocation based on a first resource block and allocation length is indicated, multiple transmissions are scheduled, the number of multiple transmissions scheduled by the DCI is above a threshold, DMRS and data are not multiplexed in frequency domain, and a number of MIMO layers is equal to one.

Secondly, CP-OFDM is to be selected if the current waveform is DFT-s-OFDM, and at least one of the following: MCS index is above a second threshold, modulation order is above a second threshold, a number of allocated PRBs is above a second threshold and/or is in multiple of 2, 3, or 5, the allocated frequency resource is in the inner region of the carrier, resource block allocation based on bitmaps is indicated, the number of multiple transmissions scheduled by the DCI is below a threshold, and DMRS and data are multiplexed in frequency domain.

For checking whether each set of conditions is satisfied or not, a UE may be configured to check if all conditions in the set are satisfied or, alternatively, the UE may be configured to check if at least one condition in the set is satisfied. In conditions which employ thresholds, such thresholds may be hardcoded in specifications, or they may be configured by the network, for example via RRC signalling.

The UE may be configured to apply the selected waveform for transmitting or receiving the one or more scheduled transmission(s). Optionally, the UE applies the selected waveform for transmitting and/or receiving subsequent transmissions, until the waveform is switched again.

In the following, an example is described. In this example, the currently used waveform is CP-OFDM and the set of conditions corresponding to phase 210 comprises that MCS index is lower than 10 (for example, MCS table 1, that is, modulation order is lower than 4) and current waveform is CP-OFDM and multiple transmissions (such as repetitions) are scheduled. An AND interpretation is applied in this example, in other words, all the conditions as highlighted above must be satisfied for the set of conditions to be considered to be satisfied. Further, the n least-significant bits of FDRA are used to convey the waveform selection indication.

Firstly, assuming the UE is scheduled with CP-OFDM, MCS 11 and repetitions, or MCS 8 and single transmission, or MCS11 and single transmission. In this case, the UE determines that at least one condition of the set of conditions of phase 210 is not fulfilled, hence it will not check the LSB of the FDRA field for determining the waveform selection indication. All n bits of the FDRA field are used for frequency domain determination normally.

Secondly, assuming the UE is scheduled with CP-OFDM, MCS0 and repetitions, the UE will determine that the set of conditions of phase 210 is fulfilled, and it will responsively recover the waveform selection indication from the LSB of the FDRA comprised in the DCI. A waveform selected based in the waveform selection indication will then be used at least for the data scheduled by the DCI which carried the waveform selection indication.

Further, the bits of the FDRA not carrying the waveform selection indication are read by the UE to determine the frequency-division resource access. Assuming random access, RA, type 1 and a bandwidth part, BWP, of 14 physical resource blocks, PRBs, $n=[\log_2 105]=7$ bits are needed for indicating all possible combinations of $L_{RB}$ and $RB_{start}$.

Three possible ways of interpreting the FDRA with the reduced number of bits include, firstly, that a rule is specified such that the UE does not expect to be indicated with a combination of $L_{RB}$ and $RB_{start}$ such that the index (that is, RIV) exceeds $(2^{n-1}-1)$. This option is relevant for switching from CP-OFDM to DFT-s-OFDM due to coverage shortage, since the number of allocated PRBs in case of coverage shortage should not be so high for keeping high energy per resource element, EPRE. A second option is that the valid $RB_{start}$ indices are halved (for example by keeping only odd or even indices), that is, the UE does not expect to be scheduled with odd $RB_{start}$ indices. A third option is that the valid $L_{RBs}$ indices are halved (for example, keeping only odd or even indices), that is, the UE does not expect to be scheduled with even or odd $L_{RBs}$ indices.

In general, the UE may interpret the remaining bits in the field where the waveform selection indication is conveyed by assuming that the UE will be signalled, using this field, an option from among a proper subset of the range of options which may be conveyed by a value in the field when all the bits of the field are used to convey the value. The system will thus acknowledge that to enable the waveform switching, it will forego for the instant the capability to signal certain configuration options. This need not result in any reduction in system performance, since when switching to DFT-s-OFDM, for example, coverage is emphasized over throughput, wherefore maximum-throughput options will not need to be conveyed, and when switching to CP-OFDM, on the other hand, throughput is emphasized, and maximum-transmit power, or maximum-physical distance, options will likely not need to be conveyed.

In the following, a second example is described. DFT-s-OFDM as such does not support random access type 0. Therefore, for switching from CP-OFDM to DFT-s-OFDM, a rule may be specified such that random access type 1 is used, regardless of the configured random access type. For switching from DFT-s-OFDM to CP-OFDM, one possibility is that random access type 1 is configured and then will be used. Another possibility is that UE is configured with dynamic random access type switching and the MSB in FDRA field of the DCI is used for indicating random access type. In this case, random access type 0 can be indicated to the UE, which is the target scenario in this example.

In the second example, the following is assumed: current/configured waveform is DFT-s-OFDM. The first set of conditions include MCS index is greater than 9 (e.g., MCS table 1, i.e., modulation order is greater than 2), current waveform is DFT-s-OFDM, and multiple transmissions (e.g., repetitions) are not scheduled. The first set of conditions is satisfied if all conditions in the set are satisfied (AND manner). Further, The LSB of n bits of the FDRA field is used for waveform selection indication.

MSB n bits of the FDRA field are used for random access type indication, in other words, dynamic random access type switching is configured. Two cases present themselves:

Firstly, assuming the UE is scheduled with MCS11 and repetitions, or MCS8 and single transmission, or MCS8 and repetitions. In this case, UE determines that at least one condition in the first set of conditions is not fulfilled, hence it will not check the LSB of the FDRA field for determining the waveform. In this case, All n−1 bits (except the MSB) of the FDRA field are used for frequency domain determination as normally. However, since dynamic RA type switching is RRC configured, there is no dynamic change between n bits to n−1 bits indication. Therefore, the base station and UE always use n−1 bits for indication and determination.

Secondly, assuming the UE is scheduled with MCS11 and single transmission. In this case, the UE determines that the first set of conditions is fulfilled, and it will check the LSB of the FDRA field for determining the waveform.

Only the remaining n−2 bits in the FDRA are then used for frequency domain determination. Therefore, an approach for FDRA determination is needed, using the remaining n−2 bits. Assuming random access type 0 with the configured RBG-Size=4 and a bandwidth part, BWP, of 20 PRBs, n−1=5 bits are needed for indication The approach for FDRA determination using the remaining n−2 bits could be the following:

The UE changes the RBG-Size according to the BWP size and n−2=4 bits, e.g., new-RBG-Size=[BWP_size/(n−2)]=5.

Figure 3:
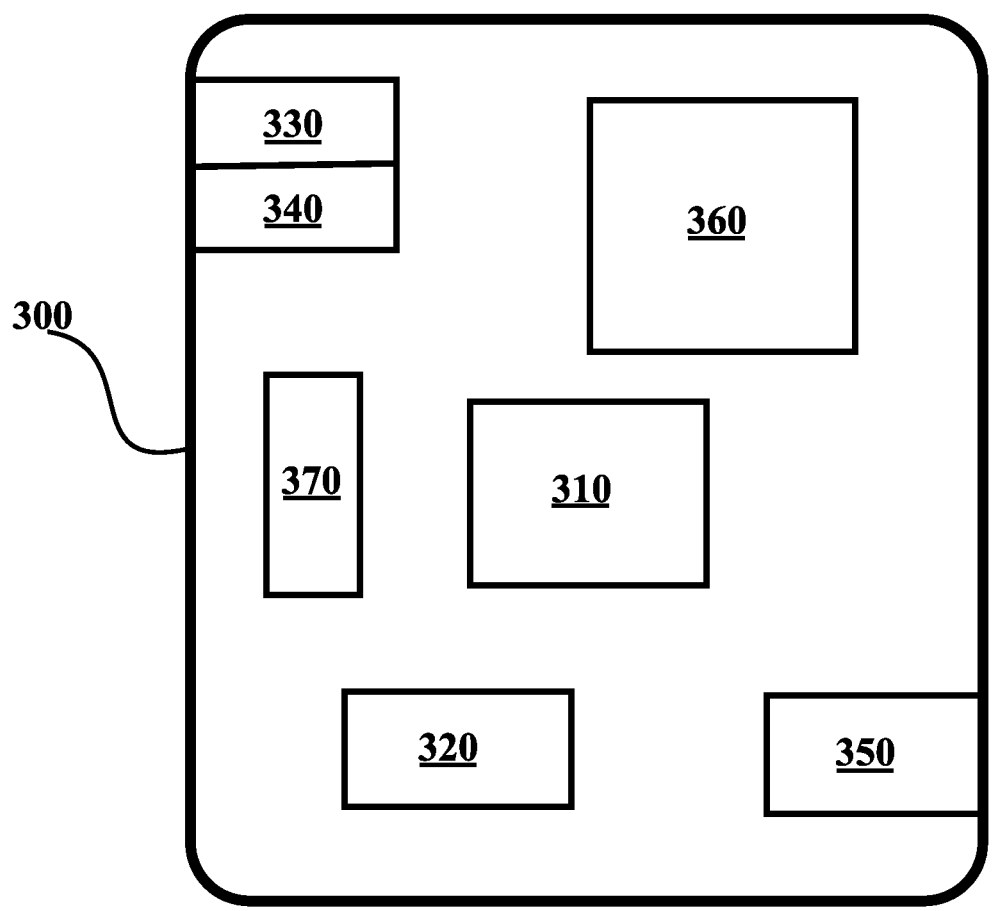
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a UE 110 or 120 or, in applicable parts, base station 130 of FIG. 1. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. When processor 310 comprises more than one processor, device 300 may be a distributed device wherein processing of tasks takes place in more than one physical unit. Processor 310 may be a control device. A processing core may comprise, for example, a Cortex-A8 processing core manufactured by ARM Holdings or a Zen processing core designed by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300, such as determining, obtaining, using or providing. Processor 310 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analogue and/or digital circuitry, and (b) combinations of hardware circuits and software, such as, as applicable: (i) a combination of analogue and/or digital hardware circuit(s) with software/firmware and (ii) any portions of hardware processor(s) with software (including digital signal processor(s)), software, and memory(ies) that work together to cause an apparatus, such as a mobile phone or base station, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300. Memory 320 may be non-transitory. The term "non-transitory", as used herein, is a limitation of the medium itself (that is, tangible, not a signal) as opposed to a limitation on data storage persistency (for example, RAM vs. ROM).

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
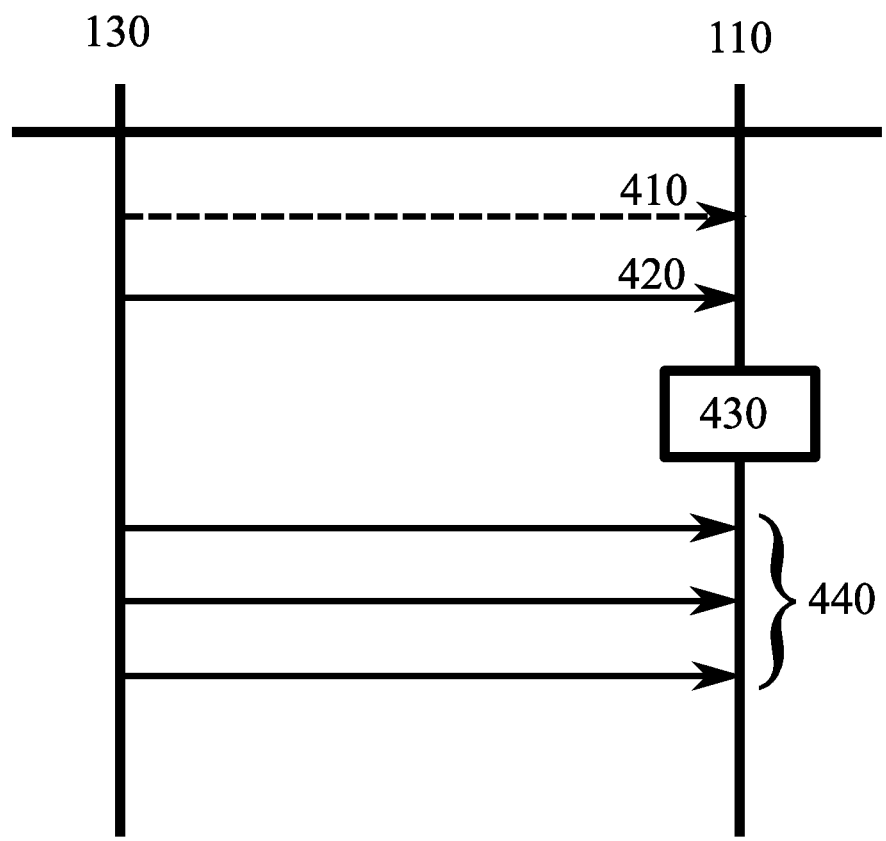
FIG. 4 illustrates signalling in accordance with at least some embodiments of the present invention.

FIG. 4 illustrates signalling in accordance with at least some embodiments of the present invention. On the vertical axes are disposed, on the left, base station 130 of FIG. 1, and on the right, UE 110, likewise of FIG. 1. Time advances from the top toward the bottom.

In optional phase 410, base station 130 signals to UE 110 to indicate to the UE that the two-stage method for waveform switching will be active. Where this phase is absent, UEs may be configured to always have the two-stage waveform switching method active, for example. The signal of phase 410 may be provided using RRC signalling, for example.

In phase 420, the base station transmits a DCI to UE 110. This DCI schedules one or more transmissions in the downlink direction. Responsively in phase 430, the UE performs its part of the two-stage method, first determining if the condition(s) is/are satisfied, and if this is the case, retrieving the waveform selection indication from the DCI, as described herein above. In this example, the condition(s) are satisfied and the UE retrieves the waveform selection indication, which indicates a switch in the waveform from a first waveform to a second waveform. In case the waveform selection indication is sent in a field where also other information is conveyed, the UE will interpret that other information, taking into account the reduced number of bits available, as the waveform selection indication consumes at least one of the bits in the field. Phase 430 corresponds to phases 220 and 230 of FIG. 2.

In phase 440, the base station transmits, and the UE received, transmissions using the waveform indicated by the waveform selection indication conveyed in phase 420.

The two-stage method described herein provides several advantages. In detail, is avoids a continuous DCI overhead compared to the explicit indication solution using an always sent dedicated DCI field/bit(s). Further, the herein disclosed method minimizes impacts on the usage of the repurposed field compared to the explicit indication solutions using repurposed bit(s) in DCI field. This is so, since the bits are borrowed from this field only when the condition(s) of phase 210 are fulfilled. If they are not fulfilled, all the bits of the field are used as normally, without reserving any for the waveform selection indication. Yet further, the herein disclosed two-stage method minimizes scheduling restrictions and the complexity at the UE side for checking conditions, compared to signaling solutions that use only implicit indications. The disclosed two-stage method offers a middle ground for implicit and explicit indications.

Figure 5:
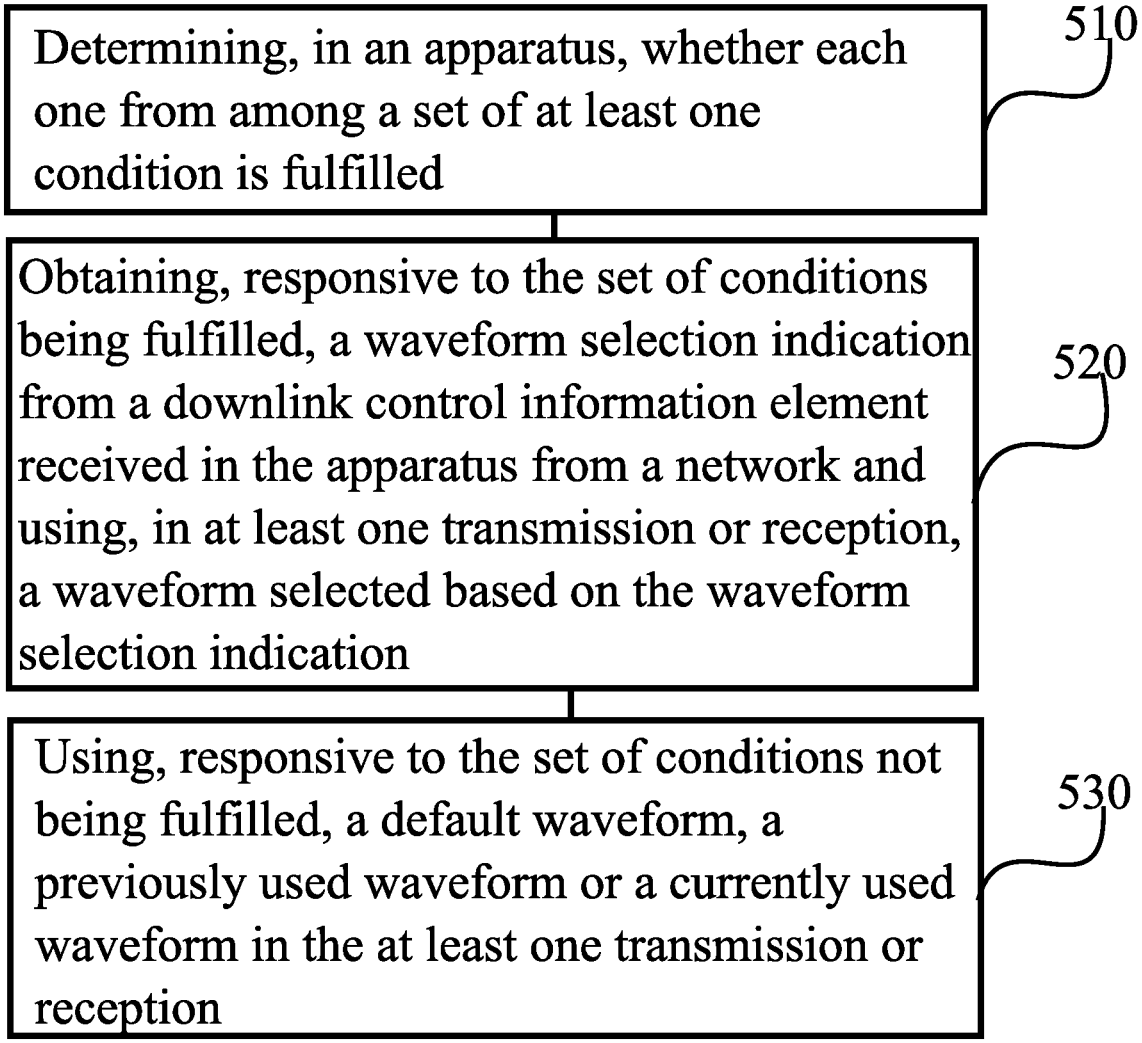
FIG. 5 is a flow graph of a method in accordance with at least some embodiments of the present invention.

FIG. 5 is a flow graph of a method in accordance with at least some embodiments of the present invention. The phases of the illustrated method may be performed in UE 110, for example, or in a control device configured to control the functioning thereof, when installed therein.

Phase 510 comprises determining, in an apparatus, whether each one from among a set comprising at least one condition is fulfilled. For example, this may comprise determining that all the conditions in the set are fulfilled. Phase 520 comprises, responsive to the set of conditions being fulfilled, obtaining a waveform selection indication from a downlink control information element received in the apparatus from a network, and using, in at least one transmission or reception, a waveform selected based on the waveform selection indication. When the determining of phase 510 comprises checking that all the conditions in the set are fulfilled, phase 520 takes place as a response to all the conditions in the set being fulfilled. Phase 530 comprises, responsive to the set of conditions not being fulfilled, using a default waveform, a previously used waveform or a currently used waveform in the at least one transmission or reception. When the determining of phase 510 comprises checking that all the conditions in the set are fulfilled, phase 530 takes place as a response to at least one of the conditions in the set not being fulfilled.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in configuring wireless links.

ACRONYMS LIST

| | |
|---|---|
| CP-OFDM | cyclic prefix orthogonal frequency division multiplexing |
| DCI | downlink control information |
| DFT | discrete Fourier transform |
| DFT-s-OFDM | DFT-spread orthogonal frequency division multiplexing |
| FDRA | frequency domain resource allocation |
| FDSS | frequency domain spectrum shaping |
| PRB | physical resource block |
| PDSCH | physical downlink shared channel |
| PUSCH | physical uplink shared channel |
| RBG | resource block group |
| RRC | radio resource control |
| UE | user equipment |

REFERENCE SIGNS LIST

| | |
|---|---|
| 110, 120 | user equipment |
| 130 | base station |
| 121, 122 | wireless links |
| 140 | core NW node |
| 150 | gateway |
| 160 | further network |
| 210-250 | phases of the process of FIG. 2 |
| 300-370 | structure of the device of FIG. 3 |
| 410-440 | phases of the process of FIG. 4 |
| 510-530 | phases of the method of FIG. 5 |

The invention claimed is:

1. An apparatus comprising at least one processing core and at least one memory storing instructions that, when executed by the at least one processing core, cause the apparatus at least to:
   determine whether each condition from among a set comprising at least one condition is fulfilled;
   based on the set of conditions being fulfilled, obtain a waveform selection indication from an element of a downlink control information element received in the apparatus from a network, and use, in at least one transmission or reception, a waveform selected based on the waveform selection indication, and based on the set of conditions not being fulfilled, use a default waveform, a previously used waveform or a currently used waveform in the at least one transmission or reception;

obtain the waveform selection indication from a field of the downlink control information; and obtain a configuration indication other than the waveform selection indication from bits of the field that the apparatus is not configured to obtain the waveform selection indication from;

wherein the field is a frequency domain resource assignment field and the configuration indication other than the waveform selection indication is resource allocation of resource blocks to be used for a physical downlink shared channel or a physical uplink shared channel.

2. The apparatus according to claim 1, wherein the apparatus further caused to:

decide, based on a second indication from the network, whether to determine whether the set of conditions is fulfilled and obtain the waveform selection indication.

3. The apparatus according to claim 1, wherein the apparatus further caused to:

determine, based on an extent indication received from the network, whether to apply the selected waveform to one transmission or reception, or to a plurality of transmissions or receptions.

4. The apparatus according to claim 1, wherein the set comprises a condition relating to the default waveform, the previously used waveform or the currently used waveform.

5. The apparatus according to claim 1, wherein the set comprises at least one of the following: a condition relating to contents of the downlink control information element or a condition relating to at least one characteristic of the at least one transmission.

6. The apparatus according to claim 1, wherein the apparatus is a user equipment configured to operate in a cellular communication system.

7. A method comprising:

determining, in an apparatus, whether each condition from among a set comprising at least one condition is fulfilled;

based on the set of conditions being fulfilled, obtaining a waveform selection indication from an element downlink control information received in the apparatus from a network, and using, in at least one transmission or reception, a waveform selected based on the waveform selection indication, and based on the set of conditions not being fulfilled, using a default waveform, a previously used waveform or a currently used waveform in the at least one transmission or reception;

obtaining the waveform selection indication from a field of the downlink control information; and obtaining a configuration indication other than the waveform selection indication from bits of the field that the apparatus is not configured to obtain the waveform selection indication from;

wherein the field is a frequency domain resource assignment field and the configuration indication other than the waveform selection indication is resource allocation of resource blocks to be used for a physical downlink shared channel or a physical uplink shared channel.

8. The method according to claim 7, further comprising:

deciding, based on a second indication from the network, whether to determine whether the set of conditions is fulfilled and obtain the waveform selection indication.

9. The method according to claim 7, further comprising:

determining, based on an extent indication received from the network, whether to apply the selected waveform to one transmission or reception, or to a plurality of transmissions or receptions.

10. The method according to claim 7, wherein the set comprises a condition relating to the default waveform, the previously used waveform or the currently used waveform.

11. The method according to claim 7, wherein the set comprises at least one of the following: a condition relating to contents of the downlink control information element or a condition relating to at least one characteristic of the at least one transmission.

* * * * *